United States Patent
Huebner

(10) Patent No.: US 7,413,389 B1
(45) Date of Patent: Aug. 19, 2008

(54) ADJUSTABLE CALIBRATED PIVOT-ARM STOP

(76) Inventor: Randall J. Huebner, 18000 SW. Bany Rd., Beaverton, OR (US) 97007

( * ) Notice: Subject to any disclaimer, the term of this patent is extended or adjusted under 35 U.S.C. 154(b) by 454 days.

(21) Appl. No.: 11/014,200

(22) Filed: Dec. 15, 2004

Related U.S. Application Data

(60) Provisional application No. 60/530,104, filed on Dec. 15, 2003.

(51) Int. Cl.
*B23B 39/00* (2006.01)
(52) U.S. Cl. ........................ 408/87; 144/253.2
(58) Field of Classification Search ............... 408/87, 408/89, 90; 33/638, 642; 144/253.1, 253.2, 144/253.5
See application file for complete search history.

(56) References Cited

U.S. PATENT DOCUMENTS

| | | | |
|---|---|---|---|
| 3,185,470 A | | 5/1965 | Zitner |
| 4,072,439 A | * | 2/1978 | Diggs ........................ 408/90 |
| 4,418,901 A | * | 12/1983 | Woods et al. ................. 269/71 |
| 5,318,392 A | * | 6/1994 | Svetlik et al. ............... 408/103 |
| 5,337,641 A | * | 8/1994 | Duginske ..................... 83/468 |
| 5,403,129 A | | 4/1995 | Steussy |
| 5,634,748 A | * | 6/1997 | Brazell et al. ................. 408/89 |
| 5,765,273 A | * | 6/1998 | Mora et al. ................... 29/560 |
| 5,980,167 A | * | 11/1999 | Chen ........................... 408/87 |
| 6,557,601 B1 | * | 5/2003 | Taylor ..................... 144/253.1 |

* cited by examiner

*Primary Examiner*—Daniel W Howell
(74) *Attorney, Agent, or Firm*—Kolisch Hartwell, P.C.

(57) ABSTRACT

Systems for positioning a work piece relative to a tool. These systems may include, among others, apparatus and methods, such as a worktable for a drill press or similar machine, for positioning a work piece, such as wood, plastic, metal, and/or other material, relative to a tool, such as a cutting, shaping, and/or finishing tool. The worktable may be configured, among others, to position a work piece in two planes relative to the axis of the tool.

10 Claims, 2 Drawing Sheets

ADJUSTABLE CALIBRATED PIVOT-ARM STOP

CROSS-REFERENCES TO PRIORITY APPLICATION

This application claims priority from U.S. Provisional Patent Application Ser. No. 60/530,104, filed Dec. 15, 2003, which is incorporated herein by reference in its entirety for all purposes.

CROSS-REFERENCES TO ADDITIONAL MATERIALS

This application incorporates by reference in its entirety for all purposes the following U.S. Pat. Nos. 3,185,470, issued Jul. 30, 1963; and No. 5,403,129, issued Apr. 4, 1995.

BACKGROUND

Tools are devices used to perform or facilitate mechanical work. The term "tool" may be used to denote the entire instrument (such as a hammer or screwdriver) or only a portion of the instrument (such as a cutting or shaping part in a machine or machine tool). Tools typically are used to perform some action on a "work piece," such as a piece of wood, metal, or plastic, and may be used alone and/or in conjunction with a worktable or workbench used to support the work piece and/or tool.

Drill presses are exemplary tools used mainly for producing or modifying holes in a work piece. These work pieces most commonly are positioned by marking the work piece with the center location of a desired drill hole. The work piece is then placed under the cutting tool and moved around on the table until the center of the tool corresponds with the mark. The work piece may then be clamped to the table for drilling. Unfortunately, this method suffers from two significant drawbacks. The first drawback is that it is hard to position the work piece accurately under the tool. This is increasingly more difficult with large drills. In particular, as drills increase in diameter, the web or center of the drill typically increases in size making it harder to estimate the true centerline of the tool. The second drawback is that clamping work pieces of various sizes can be cumbersome, time consuming, and/or the cause of further errors in work piece positioning.

Several drill press positioning systems are available on the market. These systems range from simple stopping fence arrangements, such as that shown in U.S. Pat. No. 3,185,470, issued Jul. 30, 1963, to systems that incorporate a flat table with a calibrated fence and stop in two planes, such as the Incra Drill Press Table. The simple stopping fence arrangements have no real measurement functions, acting only as a support during drilling, and a reference for subsequent parts that are to be drilled at the same location. The Incra table requires accurate tracks in the table to guide the fence with as little play as possible as it is moved into different positions.

Some of the shortcomings in the positioning systems discussed above are addressed by the drill press table shown in U.S. Pat. No. 5,403,129, issued Apr. 4, 1995, to Steussy. Unfortunately, while the Steussy table has advantages over current systems, it still is deficient in several areas. The principal deficiency in the Steussy table is that even though the table has a stop that rides along a fence, the pivoting nature of the design makes it impossible to provide a measurement function in this plane because the center or zero position of the fence changes with each pivot adjustment. Another deficiency in the Steussy table arises because the table of a drill press typically is mounted to a column; thus, when a height adjustment is made to the table, the table is allowed to rotate around the column, thereby requiring the tool to be changed to recalibrate the table position.

SUMMARY

This present teachings provide systems for positioning a work piece relative to a tool. These systems may include, among others, apparatus and methods, such as a worktable for a drill press or similar machine, for positioning a work piece, such as wood, plastic, metal, and/or other material, relative to a tool, such as a cutting, shaping, and/or finishing tool. The worktable may be configured, among others, to position a work piece in two planes relative to the axis of the tool.

DETAILED DESCRIPTION

This present teachings provide systems for positioning a work piece relative to a tool. These systems may include, among others, apparatus and methods, such as a worktable for a drill press or similar machine, for positioning a work piece, such as wood, plastic, metal, and/or other material, relative to a tool, such as a cutting, shaping, or finishing tool. The worktable may be configured, among others, to position a work piece in two planes relative to the axis of the tool, for example, by providing reference surfaces at known or selectable positions from the tool in two planes. The worktable alternatively and/or additionally may be configured, automatically, to correct error that otherwise would occur in one of the two planes during pivoting of the reference fence. The worktable alternatively and/or additionally may be configured to allow establishment of a zero position between the center of a tool axis and the table's measurement functions after table height adjustments.

The systems provided by the invention may have any suitable shape and size. In an exemplary embodiment, the systems may include a worktable having an at least substantially flat surface attached or otherwise associated with a machine tool such as a drill press with the face of the worktable oriented at least substantially perpendicular to the axis of the tool. The worktable may include an adjustable fence that is pivotable in a slot from a corner of the table surface. Calibrations may be located opposite the pivot, to provide the distance from the center of the cutting tool to the edge of the fence in the Y-axis. These calibrations may be larger or smaller than the actual distances, depending on whether the calibrations are located farther from or closer to the pivot than the tool axis, respectively. The worktable further may include a stop and/or other mechanism calibrated to allow positioning of a work piece in the X-axis. In at least some embodiments, a track running between the table and the underside of the fence maintains the X-axis stop in the selected calibrated position, regardless of the fence location. This maintenance mechanism may involve interplay between the geometry of the track and a slotted (or other extended or non-point-like) connection between the pivot fence and the pivot. For example, the track may have a generally arcuate shape, but not a single radius of curvature.

Figure 1:
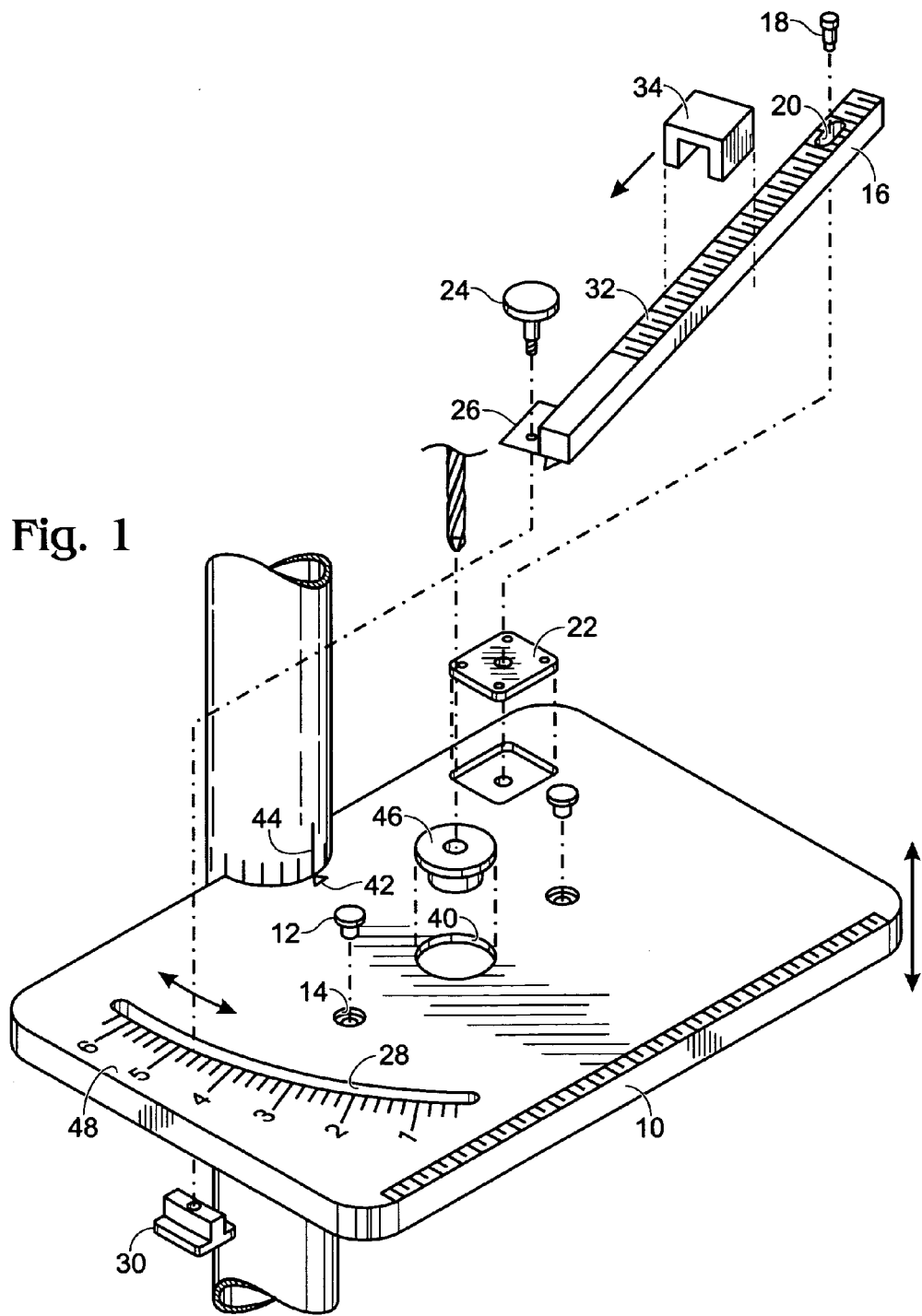
FIG. 1 is an exploded perspective view of an exemplary drill press and associated worktable, in accordance with aspects of the present teachings.

FIG. 1 is an overall exploded perspective view of an exemplary drill press and associated worktable, in accordance with aspects of the present teachings. The worktable may be attached to and/or otherwise supported by the drill press using any suitable mechanism(s). For example, here, the worktable includes a base 10 that is attached to the existing drill press table with bolts 12 and/or other fasteners inserted through mounting holes 14 in the worktable and slots or holes in the existing platform. A pivot-arm 16 is mounted on the table base 10 by a pivot bolt 18 that is inserted through a slot 20 in the pivot-arm and threaded into a pivot insert 22 that is rigidly mounted to the table base. A y-axis lock bolt 24 is inserted through a pivot arm flange 26 and a positioning track 28, and threaded into a pivot arm lock nut 30. When y-axis lock bolt 24 is loose, the pivot arm is free to rotate around pivot bolt 18. The y-axis lock bolt 24 travels in positioning track 28. Positioning track 28 may be configured to maintain the correct location of an x-axis scale 32 and an x-axis sliding stop 34 relative to the tool axis, regardless of the position of the pivot arm. Slot 20 located in pivot arm 16 allows the pivot arm to move in the x-axis as determined by positioning track 28. The x-axis-sliding stop 34 is positional along pivot arm 16, with the distance from the tool centerline indicated by the x-axis scale 32.

Setup and installation of the worktable may include one or more of the following steps, typically performed in the indicated order, but more generally performed in any suitable order. The drill press table is loosely mounted to the existing platform utilizing mounting holes 14. A dowel 36 is placed in the drill chuck or collet. An alignment bushing 38 is placed in an alignment hole 40 in the table. The dowel is lowered into the central hole of alignment bushing 38 to calibrate the position of the tool relative to the table's x and y-axis measurement functions. The bolts placed in mounting holes 14 are secured, thereby fixing the table to the drill press. A mark is placed on the column of the drill press, which corresponds to the position of an alignment indicator 42. The process is repeated at a second table height, providing two marks on the column. A scribe line (or other indicator) is created on the column intersecting the two marks. The scribe line is then used as an aid in calibrating the table during use at different heights. Further calibration after mounting may be effected simply by rotating the table into the proper position to align alignment indicator 42 and column indicator 44. The scribe line typically would be used for rough table alignment, while the dowel and alignment bushing typically would be used for more accurate calibration of the table, as necessary or desired after height adjustments.

Use of the worktable may include one or more of the following steps, typically performed in the indicated order, but more generally performed in any suitable order. The alignment bushing 38 is replaced with a drill plug 46. The drill plug provides maximum support of the work piece and can be replaced if it becomes damaged by drills passing through the work piece. Next, pivot arm 16 is set and secured at the desired y-axis dimension, for example, as determined by a y-axis scale 48. The x-axis sliding stop 34 then is set at the desired x-axis setting and locked in place. The work piece is placed against pivot arm 16 and x-axis sliding stop 34. Clamps may be used as necessary or desired to secure the work piece to either table base 10 and/or pivot arm 16. A drill or other tool is then used to create or modify a hole and/or to perform any other selected function at the desired x and y location.

Figure 2:
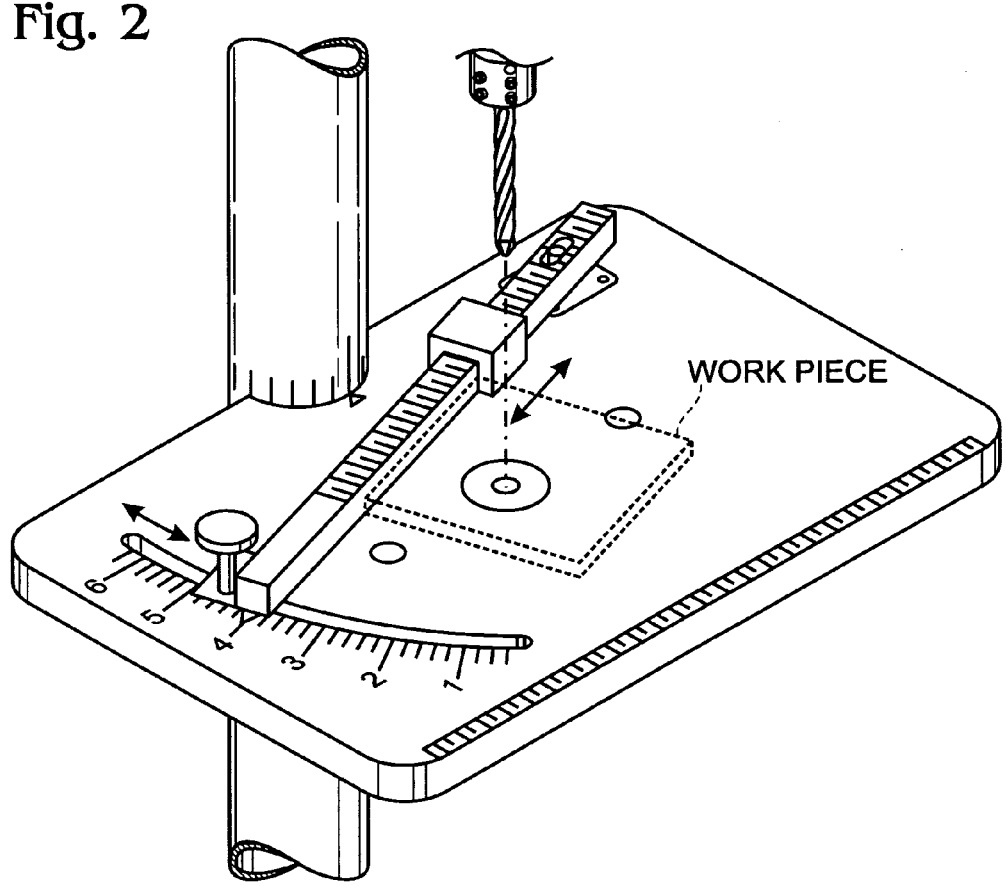
FIG. 2 is a perspective view of the drill press and worktable of FIG. 1.

FIG. 2 shows a work piece positioned on the table at a predetermined position.

Figure 3:
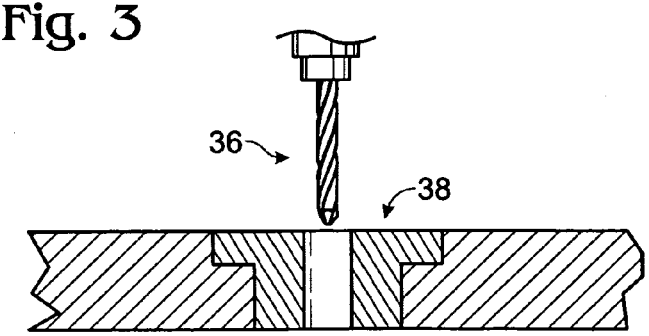
FIG. 3 is a partially cross-sectional view of the drill press and worktable of FIGS. 1 and 2, showing the relationship between the cutting tool and alignment bushing, among others.

FIG. 3 shows alignment bushing 38 and dowel 36 installed in the drill chuck. The dowel is lowered into the central opening of alignment bushing 38 during calibration.

The size and number of calibrations may be determined by the size of the worktable, the size of the intended work pieces, and the desired precision. These calibrations may be the same or different between the different dimensions (e.g., the X and Y dimensions). Exemplary calibrations may run from 0 to 20 inches, or 0 to 10 inches, or 0 to 5 inches, among others. In some embodiments, the dimensions may begin below zero, meaning that the center of a drill (or other tool) would miss the object. In these embodiments, the edges of the drill still might hit the object, for example, to drill an indentation in a border or margin of the object (e.g., to make a scalloped border). In other embodiments, the dimensions may begin above zero, meaning that the center of the drill (or other tool) would might not be able to hit the edge of the object, just interior points (at least as measured from the fence).

The systems such as the worktable provided by the present teachings may be used in connection with any suitable tool(s) and/or other apparatus. For example, the systems may be used with manual and/or automatic drill presses (including bench and floor drill presses, among others), punch presses, kick presses, stamp presses, nail presses, staplers, riveters, eyelet (e.g., eye and grommet) machines, and/or threading (e.g., tap and die) machines, among others. These systems may involve movement of a tool along a tool axis, and placement or movement of a work piece along an arc (such as a line) or surface (such as a plane) oriented at some angle (such as perpendicular) relative to the surface. The relative orientations of the tool axis and work piece may be adjusted by altering the orientations of at least one of the tool, the work piece, and the work table, among others. The tool axis may have any suitable orientation, including vertical (e.g., in an upright drill press), horizontal, and/or radial, among others. In some (e.g., gang) embodiments, there may be multiple tools, with multiple tool axes.

The systems such as the worktable provided by the present teachings may be used for any suitable function(s). For example, the systems may be used for drilling (e.g., making a hole where none existed previously), boring (e.g., enlarging a hole to obtain a continuous inside diameter, or a stepped, tapered, countoured, or recessed diameter), counterboring (e.g., enlarging a portion of a hole), countersinking (e.g., enlarging the entrance to a hole), punching (e.g., poking a hole), reaming (e.g., enlarging a hole), stamping (e.g., pressing an imprint and/or cutting a hole), tapping (e.g., forming internal threads), threading (e.g., forming internal or external threads), and/or turning (e.g., removing material from an outside diameter to form a straight, tapered, and/or contoured cylindrical surface), among others.

SELECTED EMBODIMENTS

This section describes selected embodiments of the invention, presented as a series of indexed paragraphs. These examples are included for illustration and are not intended to limit or define the entire scope of the invention.

1. A table for positioning in two planes comprising a pivoted fence for location of a work piece in one plane. A stop may be positioned on the fence for location of a work piece in a second plane. During rotation of the fence, the pivot position of the fence may be altered to maintain the correct location of the work piece relative to the tool.

2. The device of paragraph 1, further comprising an opening in the table allowing alignment of the tool axis and the table measurement functions.

3. The device of paragraph 2, wherein the opening is circular.

4. The device of paragraph 3, wherein the opening is larger than 0.5 inches.

5. The device of paragraph 1, wherein the fence pivot is located in a corner of the table.

6. The device of paragraph 5, wherein the fence swings freely on the pivot, thereby allowing differing distances from the fence face to the center of the tool.

7. The device of paragraph 1, wherein the table is rigidly fixed to a drill press.

8. The device of paragraph 1, wherein an indicator on the table aligns with a known position on the post of the drill press.

9. The device of paragraph 1, further comprising a measurement scale that indicates the distance from the fence face to the tool.

10. A method of positioning a work piece relative to a tool by establishing a reference surface in two planes, the method comprising (1) a table mounted on a machine such that the table is perpendicular to a tool axis, the table comprising a pivoted fence for location of a work piece in one plane. A stop is positioned on the fence for location of a work piece in a second plane. A coupling between the fence and table alters the pivot position of the fence to maintain the correct location of the work piece relative to the tool in a second plane; (2) pivoting the fence to establish a desired distance between the fence and the tool; (3) positioning a stop along the fence at a desired distance from the tool; and (4) locating the work piece against both the fence and stop at a desired position.

11. The method of paragraph 10, wherein the table is rigidly fixed to a drill press.

12. The method of paragraph 10, wherein the tool is a drill.

13. The method of paragraph 10, further comprising the step of aligning the tool centerline with a zero position on the table.

The disclosure set forth above may encompass one or more distinct inventions, with independent utility. Each of these inventions has been disclosed in its preferred form(s). These preferred forms, including the specific embodiments thereof as disclosed and illustrated herein, are not intended to be considered in a limiting sense, because numerous variations are possible. The subject matter of the inventions includes all novel and nonobvious combinations and subcombinations of the various elements, features, functions, and/or properties disclosed herein. The following claims particularly point out certain combinations and subcombinations regarded as novel and nonobvious. Inventions embodied in other combinations and subcombinations of features, functions, elements, and/or properties may be claimed in applications claiming priority from this or a related application. Such claims, whether directed to a different invention or to the same invention, and whether broader, narrower, equal, or different in scope to the original claims, also are regarded as included within the subject matter of the inventions of the present disclosure.

I claim:

1. A drill press, capable of positioning a work piece relative to a predefined position in two dimensions, comprising:
    an at least substantially planar support surface configured to support the work piece during positioning;
    a first guide mechanism having a first engagement portion configured to contact a first portion of the work piece, the first guide mechanism being configured to pivot in a pivot plane at least substantially parallel to, or coplanar with, the at least substantially planar surface, the first guide piece being configured to position the work piece such that the predefined position is a first preselected distance from the first portion of the work piece;
    a second guide mechanism having a second engagement portion configured to contact a second portion of the work piece, the second guide piece being configured to position the work piece such that the predefined position is a second preselected distance from the second portion of the work piece; and
    a drill supported by a post configured to travel at least oblique to the plane of the at least substantially planar surface and to engage a work piece positioned by the first and second guide mechanisms;
    wherein an indicator on the at least substantially planar surface aligns with a known position on the post.

2. The device of claim 1, wherein the pivot position of the first guide mechanism may be altered during rotation of the first guide mechanism to maintain the correct location of the work piece relative to the predefined position.

3. The device of claim 1, wherein the support surface defines an opening allowing alignment of the predefined position and the measurement functions.

4. The device of claim 3, wherein the opening is circular.

5. The device of claim 4, wherein the opening is larger than about 0.5 inches.

6. The device of claim 1, wherein the first guide mechanism pivots about a position located in a corner of the at least substantially planar surface.

7. The device of claim 6, wherein the first guide mechanism swings freely on the pivot, thereby allowing differing distances from the first engagement portion to the predefined position.

8. The device of claim 1, further comprising a measurement scale that indicates the distance from the first and/or second guide mechanism to the tool.

9. The device of claim 1, wherein the predefined position corresponds to the position of a tool intended to contact the work piece.

10. The device of claim 1, wherein the first guide mechanism includes an elongate member, and wherein the second guide mechanism is slidably attached to the first guide mechanism.

* * * * *